Figure 1:
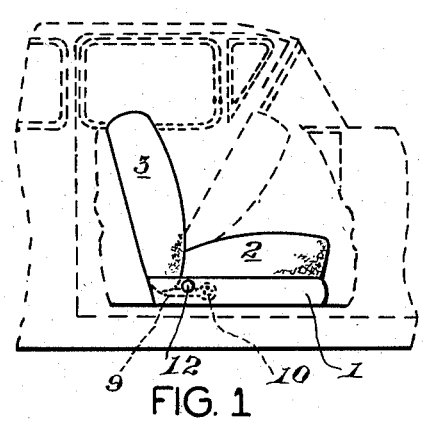

Oct. 13, 1959  B. B. SANDERSON  2,908,530
DOOR-ACTUATED, SEAT-RESTRAINING LOCK FOR AUTOMOBILES
Filed March 26, 1958

INVENTOR,
BILLY B. SANDERSON
BY
J. Stuart Freeman
ATTORNEY

United States Patent Office 2,908,530
Patented Oct. 13, 1959

2,908,530

DOOR-ACTUATED, SEAT-RESTRAINING LOCK FOR AUTOMOBILES

Billy B. Sanderson, Croydon, Pa.

Application March 26, 1958, Serial No. 724,186

1 Claim. (Cl. 296—65)

The object of the invention is to provide improvements in passenger automobiles generally speaking, but more specifically in safety means by which a single folding seat of a coupe, for example, cannot have its pivotally mounted back shifted in an angular direction, as when a passenger in the right rear seating position wishes to leave the car, without the adjacent door being first unlatched and opened.

In the coupe form of passenger vehicle in particular, a passenger enters and exits into and from the right rear seat position, for example, by lowering the right side forward seat and then opening the adjacent side door. In practice there has heretofore, as far as is known, been no simple device or means whereby a folding seat in the front of a car, or more particularly the angularly lowerable back of such a seat, could be prevented from being lowered when the adjacent door was in closed position, any more than such a seat back could be locked in its normally upright operative position, while the door was open.

Consequently, when a parent we will assume was accompanied by one or more children upon the rear seat of their car, and the car in motion had to be slowed or stopped suddenly, there was nothing to prevent the child or children, especially when on the right side of said rear seat, from being thrown or propelled more or less violently forward against the pivoted back of the front seat, with the result that such seat back would almost inevitably be shifted forward, and the child thrown against the right hand door, which door unless securely locked by separate means would in many cases be thrown open. Thus, the child would be first thrown against the lowered seat back, which is usually mounted at an angle when in a forward position, and thereby directed angularly towards and laterally through the open doorway, frequently with dire results to the child at least, since the driver would be unable safely to grab for the child even if able to reach it, and at the same time give to the operation of the car the attention that it normally requires.

Another object, therefore, is to provide a simple form of locking device for the back section of a seat, that may comprise a reciprocatable pin or equivalent element that is supported by the base frame of the seat, and is movable axially into the path of oscillation of said back section or an extension thereof, upon being engaged by an adjacent door when being closed, and resilient means normally positioning said pin inwardly from withdrawn position as to such seat back when said door is open.

Still another object is to provide the combination of a passenger vehicle having an internal seat, a back section that is pivotally related to said seat, and an adjacent door, with an axially movable pin or the like carried by said seat and engageable by said door, as said door approaches closed position, so as to prevent oscillation of said back section when said door is in closed position, and resilient means to normally maintain said pin in withdrawn inoperative position.

Figure 2:
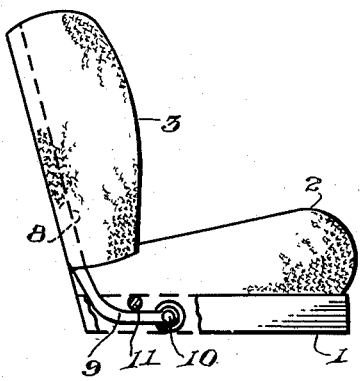
Figure 3:
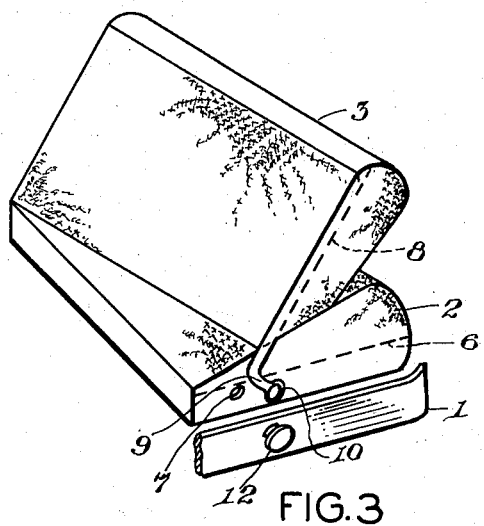
Figure 4:
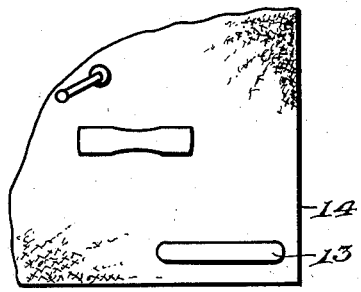
Figure 5:
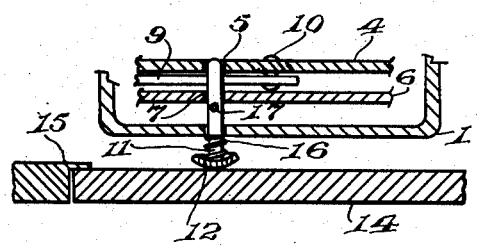

With the objects thus briefly stated, the invention comprises further details of construction and operation, which are hereinafter fully described in the following specification, when read in conjunction with the accompanying drawings, in which Fig. 1 is a side elevation of an automobile seat having an angularly movable back section, together with adjacent portions of the vehicle represented by broken lines; Fig. 2 is an enlarged side elevation of the seat and back section per se; Fig. 3 is a perspective view of the said seat and back section, being tilted in an angularly forward position, as when a passenger is entering or leaving the rear seat of the vehicle; Fig. 4 is a fragmentary side elevation of the vehicle door; Fig. 5 is an enlarged fragmentary section of the cooperating elements of the seat base, door and locking mechanism when the door is in closed position; and Fig. 6 is a similar section when the door is partly open and the back section of the seat is free to be moved forwardly.

Referring to the drawings, an automobile seat of the type referred to comprises the peripheral depending flange or skirt 1 of a base frame, that directly supports the usual seat cushion 2, while normally rising from the rear edge portion of said seat is the usual back section 3, which is shown in normal upright or operative position in Figs. 1 and 2, while in Fig. 1 by the dotted lines and by the full lines in Fig. 3 it is shown in its forward inoperative position, after it has been angularly oscillated to permit a person to enter or leave the space to the rear of such seat. In other words, said back section is normally in upright position (Figs. 1 and 2) when occupied, whereas it is lowered forwardly as in Fig. 3 and in the dotted line position of Fig. 1, when a passenger is entering or leaving the usual rear seat (not shown) of the vehicle.

The supporting base of said rear seat comprises, in addition to said depending flange or skirt 1, an inwardly positioned member 4 having an aperture 5, while between said skirt and said last-mentioned member is positioned a third member 6 having an aperture 7. The said back section of said seat comprises a suitable metallic frame 8, that is provided with depending angularly shaped rods 9 (one of which is shown), whose free ends are pivotally connected to said seat member 4 by means of a hinge or pivot 10, which is so positioned that when said back section is in normal upright position a pin 11, when extending through the apertures 5 and 7, is above the level of the angular portion 9 of said back rod and thus prevents such angular portion from rising, so that to the same degree said metallic frame and the rear seat section carried thereby are prevented from being oscillated into depressed forward position. (Fig. 3.)

Figure 6:
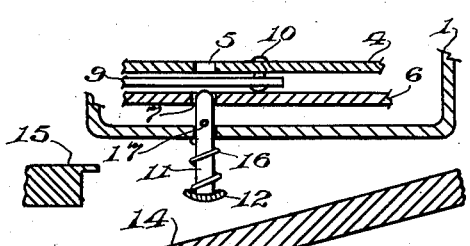

Said pin in each instance is provided with a freely projecting terminal portion 11, that carries a unitary segmental head 12 for direct engagement with a kickplate 13 or other suitable surface protection of the side door 14 of the vehicle, so that when said door is in closed position (Fig. 5) against its surrounding frame 15, said pin is forced into its innermost operative position, against the yielding tension of a surrounding coil spring 16, that is positioned by and between said segmental head and said skirt 1, and the outward movement of said pin when in withdrawn or inoperative position being limited by a pin 17, that extends transversely through said first-mentioned pin 11 and in that case encounters the inner surface of the skirt 1, as illustrated in Fig. 6. When in its said outermost position, said pin is withdrawn from the path of movement of the angular extensions 9 of the frame of said back section, so that said back section is then free to oscillate angularly into its forward position, as indicated by the position of said back in Fig. 3.

Thus, when a passenger has completed his movement, either into or from the rear seat of the vehicle, the back section of said forward seat is returned to its normal upright position and the side door closed, so as to thereby shift the locking pin 11 through the aligned apertures 5 and 7 above the adjacent portions of the frame extensions 9, and thereby prevent said frame and the rear back section from being again tilted until said back frame is released, as hereinbefore described.

Having thus described my invention, what I claim and desire to protect by Letters Patent of the United States is:

The combination of a vehicle having a door, with a seat support, and a tiltable back section having an extension pivotally secured to said support, said support comprising a pair of spaced members having aligned apertures, tilting of said back section causing said extension to pass between said members and across the axis common to said apertures, and a pin engageable by said door when adjacent to its closed position, whereby said pin is shifted axially so as to extend through both of said apertures in the path of said extension and prevent tilting of said seat References Cited in the file of this patent

UNITED STATES PATENTS

| 2,624,613 | Parmely | Jan. 6, 1953 |
| 2,872,241 | Shelden | Feb. 3, 1959 |